Jan. 15, 1957 N. R. ERICKSON 2,777,531
EMERGENCY CRASH SEAT
Filed Oct. 22, 1954 2 Sheets-Sheet 1
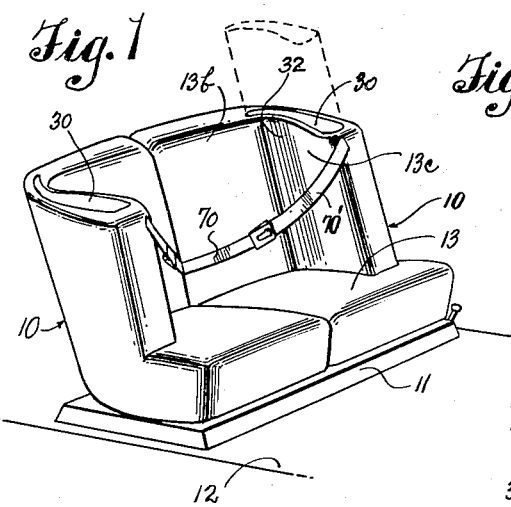
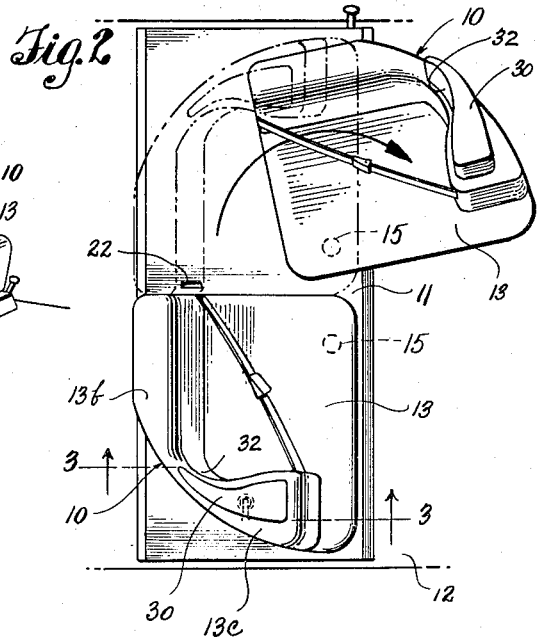
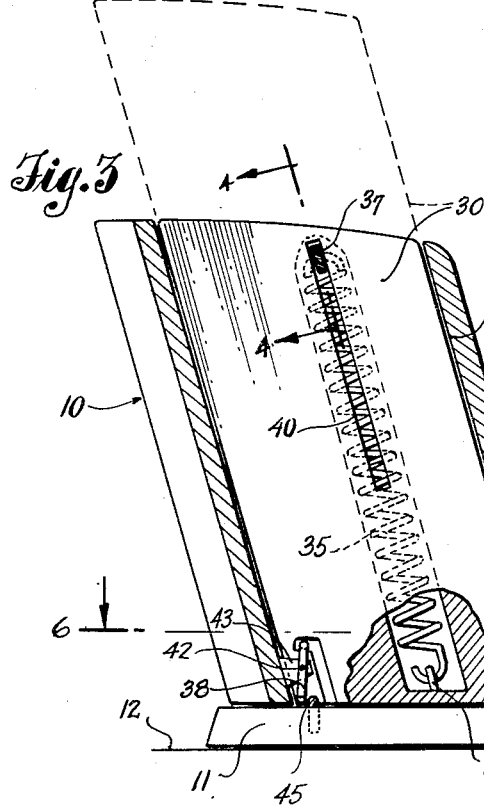
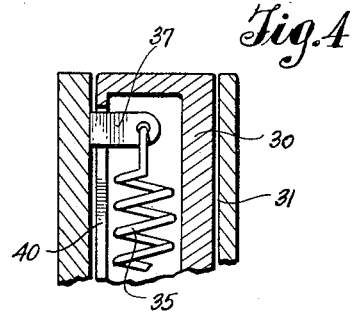
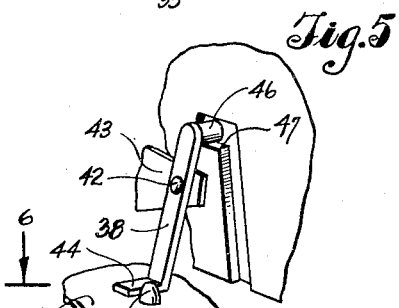
INVENTOR.
NORMAN R. ERICKSON
BY
Cook & Robinson
ATTORNEYS Jan. 15, 1957     N. R. ERICKSON     2,777,531
EMERGENCY CRASH SEAT
Filed Oct. 22, 1954     2 Sheets-Sheet 2
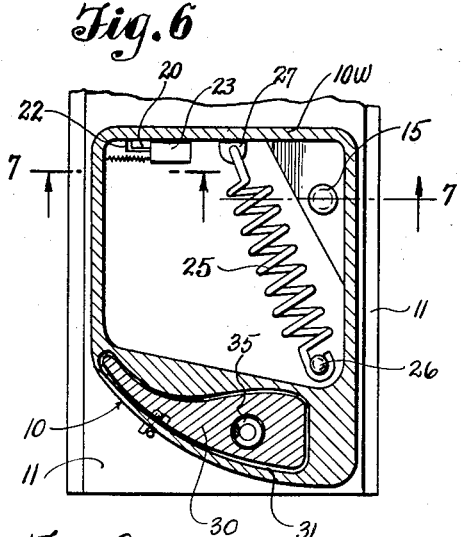
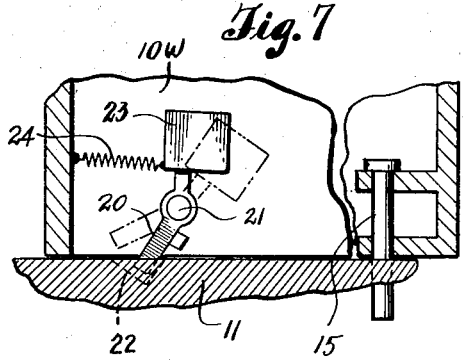
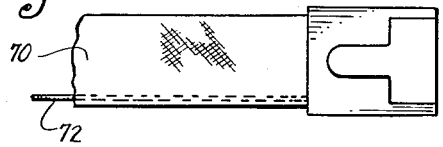
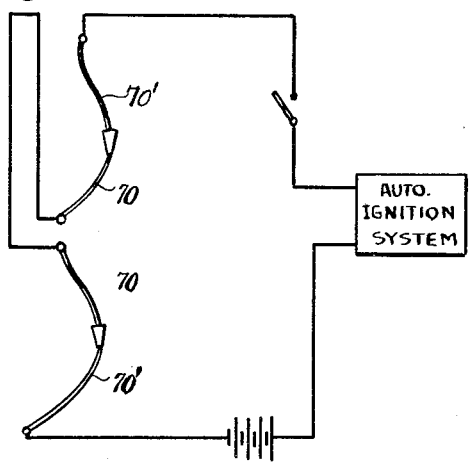
INVENTOR.
NORMAN R. ERICKSON
BY
Cook & Robinson
ATTORNEYS

United States Patent Office 2,777,531
Patented Jan. 15, 1957

2,777,531

EMERGENCY CRASH SEAT

Norman R. Erickson, Daly City, Calif.

Application October 22, 1954, Serial No. 464,073

6 Claims. (Cl. 180—82)

This invention relates to improvements in passenger seats that are especially designed for use in motor vehicles such as automobiles, trucks, airplanes and other passenger carrying vehicles that may, or usually travel at a high rate of speed, and it has reference more particularly to what I designate as an "emergency crash seat," or a "safety seat" for use in such vehicles.

It is the principal object of the present invention to provide a seat that, in the event of a sudden stop, a head-on collision or any unusually rapid deceleration of the vehicle from traveling at high speed, will be permitted to so move on its mounting under the influence of the momentum and inertia of the seat and person occupying it, that the seat structure itself will serve to restrain and protect the occupant and will act to prevent him being cast from the seat with possible fatal injury.

It is a further object of the invention to so construct and to so mount the present vehicle seat in an automobile or the like, that in the event of any exceedingly rapid deceleration, such as that which is incident to a head-on collision or a sudden stop, the seat will be caused to rotate about an eccentric or off-center affixing pivot, under the influence of the inertial forces of the seat and its occupant, and by such rotative movement, will bring a part of the seat structure into a position at which it will protectively restrain the occupant against being cast or projected forwardly, and will absorb the impact of collision and will serve to protect the occupant against possible fatal injury.

Yet another object of the invention is to provide the present seat structure with a normally retracted or housed head protecting portion that is released for projection from its housing to its functional position incident to that initial rotative movement of the seat that is caused by the inertial forces of the seat occupant being transmitted thereto following a collision or sudden stop.

A further object of the invention resides in the mode of use of safety belts with the seats to insure the positiveness of their operation.

Still further objects of the invention reside in the details of construction and combination of parts embodied in the seat structure and parts associated therewith and in the mode of operation of the seat, as will hereinafter be fully described.

In accomplishing these and other objects of the invention, I have provided the improved details of construction, the preferred forms of which are illustrated in the accompanying drawings, wherein:

Fig. 1 is a perspective view of an arrangement of seats as designed for use in an automobile, bus, coach, or the like, and embodying the improvements of the present invention therein; the seats being shown in normal position of use.

Fig. 2 is a top, or plan view of the same, but showing one of the seats as being rotated about its securing pivot to a position for the restraint and protection of its occupant; no occupant being herein shown in the seat.

Fig. 3 is a vertical section of one of the seats, this view being taken substantially on the line 3—3 in Fig. 2, and showing the extendable head protecting shield as normally housed in the seat structure and indicating, in dotted lines, its extended position.

Fig. 4 is an enlarged cross-section taken on the line 4—4 in Fig. 3 showing a detail of construction.

Fig. 5 is a perspective view of the automatically releasable latch for restraining the head shield in its housed or retracted position.

Fig. 6 is a horizontal section taken substantially on the line 6—6 in Fig. 3, particularly showing the position and location of the protective shield as housed in the side portion of the seat structure and the spring for motivating the seat when released for rotation.

Fig. 7 is an enlarged vertical section taken on the line 7—7 in Fig. 6, and showing the seat restraining latch.

Fig. 8 is an end portion of one of the safety belt straps.

Fig. 9 is a diagrammatic illustration of the ignition circuit as closed through the connections provided in the safety belts.

Referring more in detail to the drawings:

In Fig. 1, I have shown a pair of seats as they might be conveniently arranged in an automobile, bus, railway car, truck or airplane for normal use; it being understood that the seats as used in pairs, or when used singly, would be faced in the direction of normal high speed travel of the vehicle. The seats are designated, respectively, by numerals 10 and 10' and they are shown to be mounted on a base structure, or platform, 11, and this is mounted on the vehicle floor which is designated at 12. It is to be understood that the platform or base structure 11 might be of various forms of construction, depending upon the character of or purpose of the vehicle in which the seats are used and that it is preferably mounted for adjustment forwardly, rearwardly or vertically to best suit the occupant, and conform to the provisions for seat adjustment of present day automobiles.

As herein shown, the seats are paired, each comprising the usual cushioned seat portion proper, designated generally by reference character 13; a cushioned back portion 13b and a similarly cushioned side or arm portion 13c. These various parts of the seat may vary in shape, dimensions and construction in different types of vehicles, but in a general way, all will be sufficiently alike, regardless of the vehicle, that the principles of the present invention can readily be applied thereto.

In accordance with the objects of the present invention, each seat is supported for easy turning about a vertical pivot post 15 which is fixed in the supporting base 11, for example, as illustrated in Fig. 7, and as will be understood best by reference to Fig. 2, the pivot 15 for each seat is located beneath one of the forward corner portions of the seat, near its forward edge and spaced a farther distance from that adjacent side edge of the seat which extends in the longitudinal direction of the vehicle.

Referring again to the arrangement of seats as shown in Fig. 1, the pivots 15—15 are seen to be located beneath their adjacent forward corners and the bases of the two seats may rest upon the flat, smooth top surface of the base or platform 11. The seats are normally held in their side by side positions of use, as shown in Fig. 1, by releasable latch members which may be of the character of that shown in Figs. 6 and 7. Each latch member comprises a vertically directed lever 20, attached by a pivot pin or bolt 21 to an inner sidewall 10w of the seat. The lower end of the lever is adapted, when the seat is in normal position, to be received in a socket 22 formed in the top wall of the platform 11. The lever 20 extends upwardly beyond the pivot 21 and is equipped at that end with a weight 23. In the event of a sudden stop, when the vehicle is traveling at a high rate of speed, the momentum of the weight will cause the lever to swing on the pivot and its lower end to be disengaged from the socket disengaged from the socket thus to permit the seat, under its own momentum and the occupant's, to rotate about the pivot 15, as has been illustrated in Fig. 2.

In the event of the vehicle, while traveling at high speed, striking an obstruction such as a wall, building, post, or in the event of its colliding head-on with a vehicle traveling in the opposite direction, the latch 20 is immediately released. Then the momentum and the inertial forces of the seat and its occupant will cause the seat to rotate about its pivot post 15 to that position at which its back and side portions 13b and 13c will restrain the seat occupant against being cast forwardly from the seat, and at the same time will protect him from impact with objects forwardly of the seat. Seat releasing movement of the lever 20, under the influence of the weight 23, in the making of the usual stops, is prevented by means of a coiled spring 24 which is attached under tension to the weight and to the seat frame, as seen in Fig. 7. If the occupant of a seat is secured therein as by means of the safety belt with which each seat is equipped, then the rotative action of the seat is made positive and instantaneous.

It will be understood that this rotating action of the seat will take place incident to any abnormal deceleration of the vehicle that effects release of the seat retaining latch 20. However, to insure positive and instant rotation of the seats, I provide a spring actuator means for each seat as shown best in Fig. 6, wherein it is shown that a coiled spring 25 is attached at one end to a post 26 or the like, fixed in the top surface of platform 11. At its other end the spring is attached to a lug or plate 27 secured to the inside sidewall of the seat. The spring is secured under tension and its force is applied in such direction as to rotate the latch released seat on its pivot 15 as has been indicated in Fig. 2. It will be understood by reference to Fig. 2, that by reason of the spacing of the pivots 15—15 farther from the side edges than from the forward edges of the seats, when the seats swing forwardly, they also move slightly apart. By reason of this, the legs of the seat occupants will not be injuriously pinched between the forward edges of the seats as they swing toward each other. The only portions of the seat which may engage are the outer forward corners so that space will always be provided between the forward edges of the seat.

In order to give additional protection to the occupant of a seat, I have enclosed an extendable head shielding slide 30 in the side or arm portion of the seat. This slide is cushioned and it is normally housed in a vertical well 31 formed in the seat sidearm structure and is mounted for guided travel in the well from its retracted position to an extended position, as indicated in Fig. 3. The shaping of the arm or side portion of the seat is such as to provide a sort of retaining pocket 32 or recess into which the seat occupant will be pressed by his own momentum as the seat swings to the restraining position in which the seat in the upper part of the view is shown.

It is understood that the slide 30 is fitted in guides for easy sliding action in its movements between extended and retracted positions. In each seat a coiled spring 35 is attached under tension to an ear 36 applied to the lower end on the slide, and to a lug 37 applied to the arm structure at the upper end of the guideway. Latch levers 38, as shown in Fig. 5, are fixed in the seat structure at the lower end of the guideway to releasably lock the slide in its retracted or housed position. However, whenever the seat 10 starts to rotate about its pivot 15 toward a forward position, the lever 38 becomes disengaged from the slide and the spring 35 operates to instantly project the slide 30 to its extended or protective position. Upward movement of the slide under the influence of the springs 35 is limited by reason of the lug 37 extending into a longitudinal slot 40 in the slide, and engaging with the lower end of this slot when the slide is fully extended.

It is shown in Figs. 3 and 5, that the latch lever 38 extends substantially vertically and is pivoted, as at 42, between its ends on a plate 43 that is fixed to the seat frame structure. The lower end of the latch lever has a laterally turned toe 44 adapted to engage a stop 45 on the top of the base 11. At its upper end the lever has an oppositely turned stud 46 engaged against an upwardly facing shoulder 47 on the slide 30. The lever is so positioned relative to the seat pivot 15 that when the seat starts to swing forwardly, the lever is actuated by stop 45 to cause the stud to be disengaged from the shoulder, thus permitting the spring 35 to actuate the slide to its extended, protective position.

It is preferred that each seat be equipped with a safety belt as shown in Fig. 1, each belt comprises the opposite end portions 70—70' with metallic buckles at their ends that are adapted to be interlocked. To insure that the occupant of an automobile will use such belts, as an aid toward insuring the positive rotative action of the seats in case of collision, the electric circuit for the vehicle's ignition system is carried through the belts and cannot be completed without the ends of the belts being joined. In Fig. 9 a wiring diagram suitable for such connection has been shown in a diagrammatic way. It is shown in Fig. 8 that a circuit wire 72 is contained in the belt, this being a part of the circuit connection.

It is to be understood that all seats need not necessarily be of the design herein shown, and that they may be used singly or in pairs or in other combinations than that shown. The principal requirement of use is that each seat shall have sufficient clearance for rotation about its pivot 15 without interference when released.

Seats of this kind, mounted in the manner shown, will operate automatically not only to reverse the position of the occupant, but also to cushion and to protect him.

It is readily apparent that changes in details of construction might be made without departing from the spirit of the invention, and for that reason it is not desired that the scope of the claims be restricted to details but that they be given an interpretation that is commensurate with the invention herein disclosed.

Having thus described my invention, what I claim as new therein and desire to secure by Letters Patent is:

1. In a vehicle of the character described, a seat mounting base, a passenger seat mounted thereon and normally facing in the direction of travel of the vehicle, a securing pivot for said seat fixed in the base and pivotally securing the seat adjacent its side, forward corner, said seat being adapted to turn on its pivot under influence of inertial forces of the seat and its occupant incident to abnormal deceleration of the moving vehicle.

2. A seat mounted as in claim 1 wherein a yieldingly latch device normally retains the seat against turning.

3. A seat mounted as recited in claim 1 wherein the pivot member for the seat is located closely adjacent the forward edge of seat and at a greater distance from the side edge.

4. A seat mounted as in claim 1 wherein a safety belt is applied to the seat and wherein the belt comprises disconnectable parts through which the ignition circuit of the vehicle is extended, and which circuit cannot be closed so long as said parts are disconnected.

5. A seat structure as recited in claim 1 wherein the side member of the seat is formed with a vertical guideway, and wherein a head shielding member is telescopically movable into and from said guideway with spring means arranged for actuating said shielding member to extended, head protecting position and a latch device mounted for normally holding the head shielding member in a retracted position; such latch being automatically releasable incident to the initial turning movement of the seat from normal position.

6. A seat construction as recited in claim 5 wherein the said head shielding member has an upwardly facing shoulder formed thereon near its lower end, and wherein said latch device comprises a lever mounting bracket fixed to the seat, a lever pivoted between its ends on the bracket, and a stud fixed in the seat mounting base; said lever having a laterally turned portion at one end adapted for engaging said shoulder to hold the head shielding means in retracted position, and having an opposite end portion engaged with said stud and whereby the lever is actuated to disengage the shoulder incident to lateral turning of the seat.

References Cited in the file of this patent

UNITED STATES PATENTS

| | | |
|---|---|---|
| 1,250,155 | Emond | Dec. 18, 1917 |
| 2,433,950 | Henderson | Jan. 6, 1948 |
| 2,510,115 | Jakosky | June 6, 1950 |
| 2,611,562 | Exton | Sept. 23, 1952 |
| 2,660,222 | Woodsworth | Nov. 24, 1953 |
| 2,660,715 | Glass | Nov. 24, 1953 |

FOREIGN PATENTS

| | | |
|---|---|---|
| 832,856 | Germany | Feb. 28, 1952 |